United States Patent
Yi et al.

(10) Patent No.: US 10,153,878 B2
(45) Date of Patent: Dec. 11, 2018

(54) METHOD AND APPARATUS FOR HANDLING ZERO POWER CHANNEL STATE INFORMATION REFERENCE SIGNAL CONFIGURATIONS FOR DISCOVERY SIGNALS IN WIRELESS COMMUNICATION SYSTEM

(71) Applicant: LG ELECTRONICS INC., Seoul (KR)

(72) Inventors: Yunjung Yi, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/326,019

(22) PCT Filed: Aug. 31, 2015

(86) PCT No.: PCT/KR2015/009130
§ 371 (c)(1),
(2) Date: Jan. 12, 2017

(87) PCT Pub. No.: WO2016/032305
PCT Pub. Date: Mar. 3, 2016

(65) Prior Publication Data
US 2017/0207891 A1 Jul. 20, 2017

Related U.S. Application Data (60) Provisional application No. 62/043,423, filed on Aug. 29, 2014, provisional application No. 62/066,397, filed on Oct. 21, 2014.

(51) Int. Cl.
*H04L 5/00* (2006.01)
*H04J 11/00* (2006.01)
(Continued)

(52) U.S. Cl.
CPC ........ *H04L 5/0048* (2013.01); *H04J 11/0056* (2013.01); *H04W 48/14* (2013.01);
(Continued)

(58) Field of Classification Search
CPC ..... H04W 88/02; H04W 48/18; H04W 48/14; H04L 5/0048
See application file for complete search history.

(56) References Cited

FOREIGN PATENT DOCUMENTS

WO 2014109615 A1 7/2014

OTHER PUBLICATIONS

Alcatel-Lucent, PDSCH rate matching behaviours for ZP CSI-RS resources and IMRs, R1-124862 (Year: 2012).*
Huawei et al., "Remaining details related to DRS signal design", 3GPP TSG RAN WG1 Meeting #78, R1-142827, Aug. 10, 2014, 5 pages.
(Continued)

*Primary Examiner* — Jackie Zuniga Abad
(74) *Attorney, Agent, or Firm* — Lee Hong Degerman Kang & Waimey (57) ABSTRACT

A method and apparatus for receiving a zero-power channel state information reference signal (CSI-RS) configuration in a wireless communication system is provided. A user equipment (UE) receives at least one first zero-power CSI-RS configuration for data rate matching on a discovery reference signal (DRS) from a network, and receives a second zero-power CSI-RS configuration for interference measurement from the network. The at least one first zero-power CSI-RS configuration is not used for the second zero-power CSI-RS configuration.

6 Claims, 9 Drawing Sheets

(51) Int. Cl.
*H04W 48/14* (2009.01)
*H04W 48/18* (2009.01)
*H04W 88/02* (2009.01)

(52) U.S. Cl.
CPC ........ *H04W 48/18* (2013.01); *H04J 2211/001* (2013.01); *H04L 5/0035* (2013.01); *H04L 5/0073* (2013.01); *H04W 88/02* (2013.01)

(56) References Cited

OTHER PUBLICATIONS

ZTE, "Remaining details of CSI feedback for TDD eIMTA", 3GPP TSG RAN WG1 Meeting #76bis, R1-141420, Mar. 22, 2014, 8 pages.
Sharp, "On the design of the discovery signal", 3GPP TSG RAN WG1 Meeting #78, R1-143122, Aug. 10, 2014, 5 pages.
Huawei et al., "Reference signals for enhanced cell discovery", 3GPP TSG RAN WG1 Meeting #76bis, R1-141124, Mar. 22, 2014, 6 pages.
3rd Generation Partnership Project, "Technical Specification Group Radio Access Network; Evolved Universal Terrestrial Radio Access (E-UTRA); Physical channels and modulation (Release 11)", 3GPP TS 36.211 V11.5.0, Dec. 2013, section 6.10, pp. 87-107 (23 pages provided).
European Patent Office Application Serial No. 15836647.6, Search Report dated Apr. 11, 2018, 13 pages.
TSG RAN WG1, "LS on agreements on small cell discovery", 3GPP TSG RAN WG1 Meeting #78, R1-143610, Aug. 2014, 3 pages.

\* cited by examiner

METHOD AND APPARATUS FOR HANDLING ZERO POWER CHANNEL STATE INFORMATION REFERENCE SIGNAL CONFIGURATIONS FOR DISCOVERY SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2015/00913, filed on Aug. 31, 2015, which claims the benefit of U.S. Provisional Applications Nos. 62/043,423 filed on Aug. 29, 2014 and 62/066,397 filed on Oct. 21, 2014, the contents of which are all hereby incorporated by reference herein in their entirety.

BACKGROUND OF THE INVENTION

Field of the Invention

The present invention relates to wireless communications, and more particularly, to a method and apparatus for handling zero-power channel state information reference signal (CSI-RS) configurations for discovery signals in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

For small cell enhancements, physical layer aspects have been discussed. Specifically in 3GPP LTE rel-12, when a number of small cells are deployed in a macro cell coverage, the feature of small cell on/off has been discussed, in order to reduce interference, which may occur since all small cells are turned on, and to increase user packet throughput (UPT) of a user equipment (UE). To support fast transition between on/off states of the small cell, various technologies have been studied, one of which is a discovery signals. The discovery signals may be called a discovery reference signal (DRS).

Channel state information reference signal (CSI-RS) may be used for discovery signals. In this case, a method for handling zero-power CSI-RS configurations for discovery signals may be required.

SUMMARY OF THE INVENTION

The present invention a method and apparatus for handling a zero-power channel state information reference signal (CSI-RS) configuration for a discovery signal in a wireless communication system. The present invention provides data rate matching and the associated user equipment (UE) behavior to handle zero-power CSI-RS configurations configured to allow muting between discovery reference signal (DRS) CSI-RS transmissions among cells.

In an aspect, a method for receiving, by a user equipment (UE), a zero-power channel state information reference signal (CSI-RS) configuration in a wireless communication system is provided. The method includes receiving at least one first zero-power CSI-RS configuration for data rate matching on a discovery reference signal (DRS) from a network, and receiving a second zero-power CSI-RS configuration for interference measurement from the network. wherein the at least one first zero-power CSI-RS configuration is not used for the second zero-power CSI-RS configuration.

In another aspect, a method for receiving, by a user equipment (UE), a reference signal in a wireless communication system is provided. The method includes receiving only one of a positional reference signal (PRS) or a discovery reference signal (DRS) in a subframe from a network.

Zero-power CSI-RS configurations for discovery signals can be handled efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
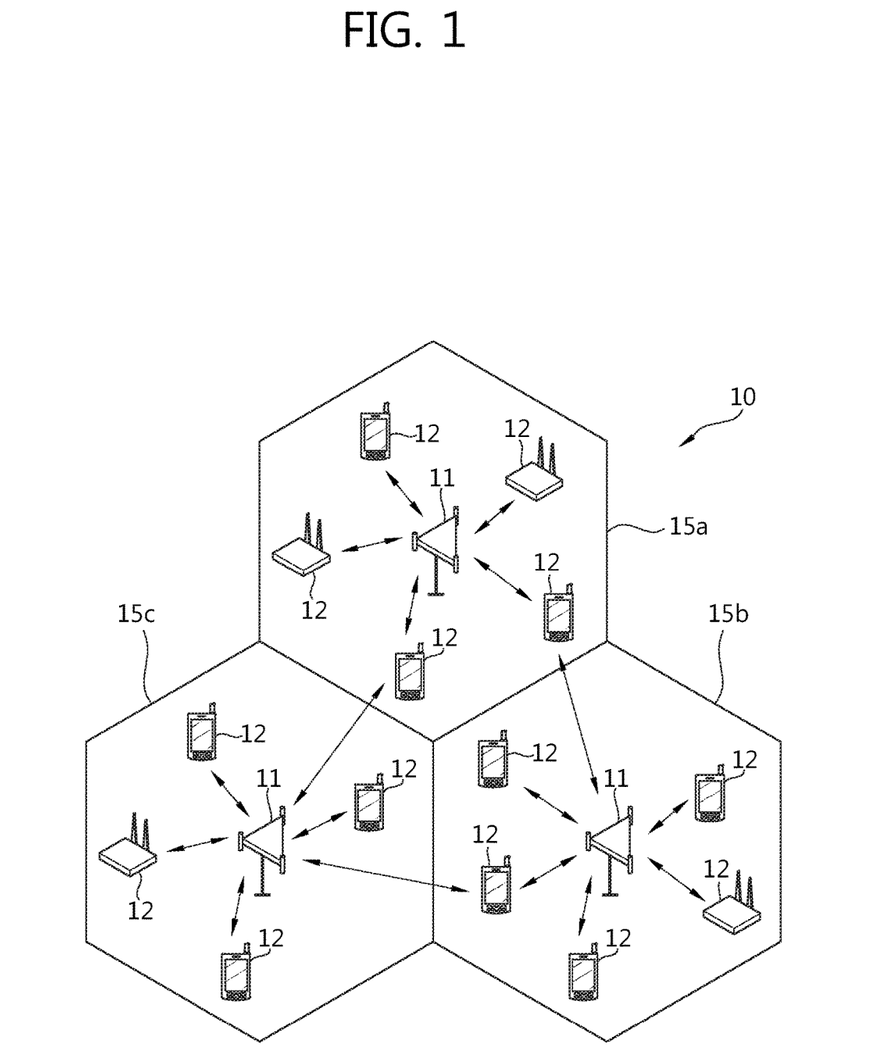
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
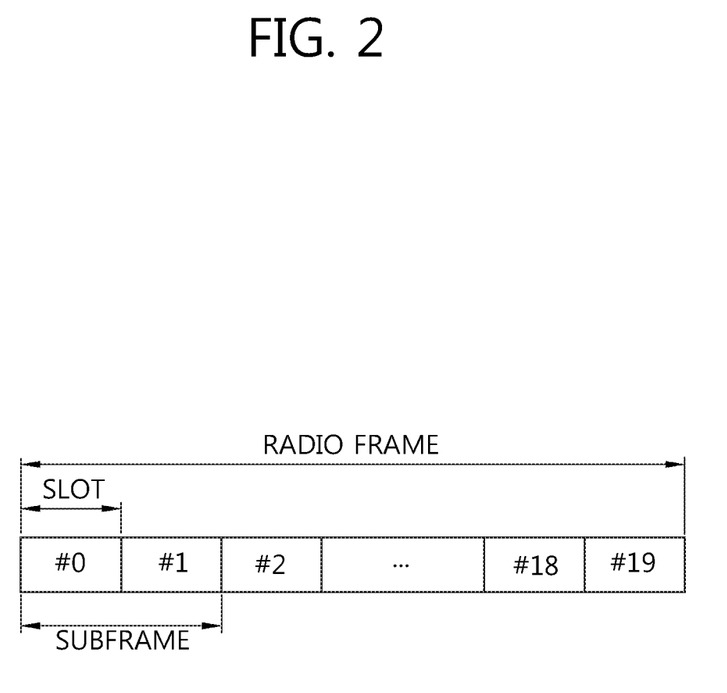
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
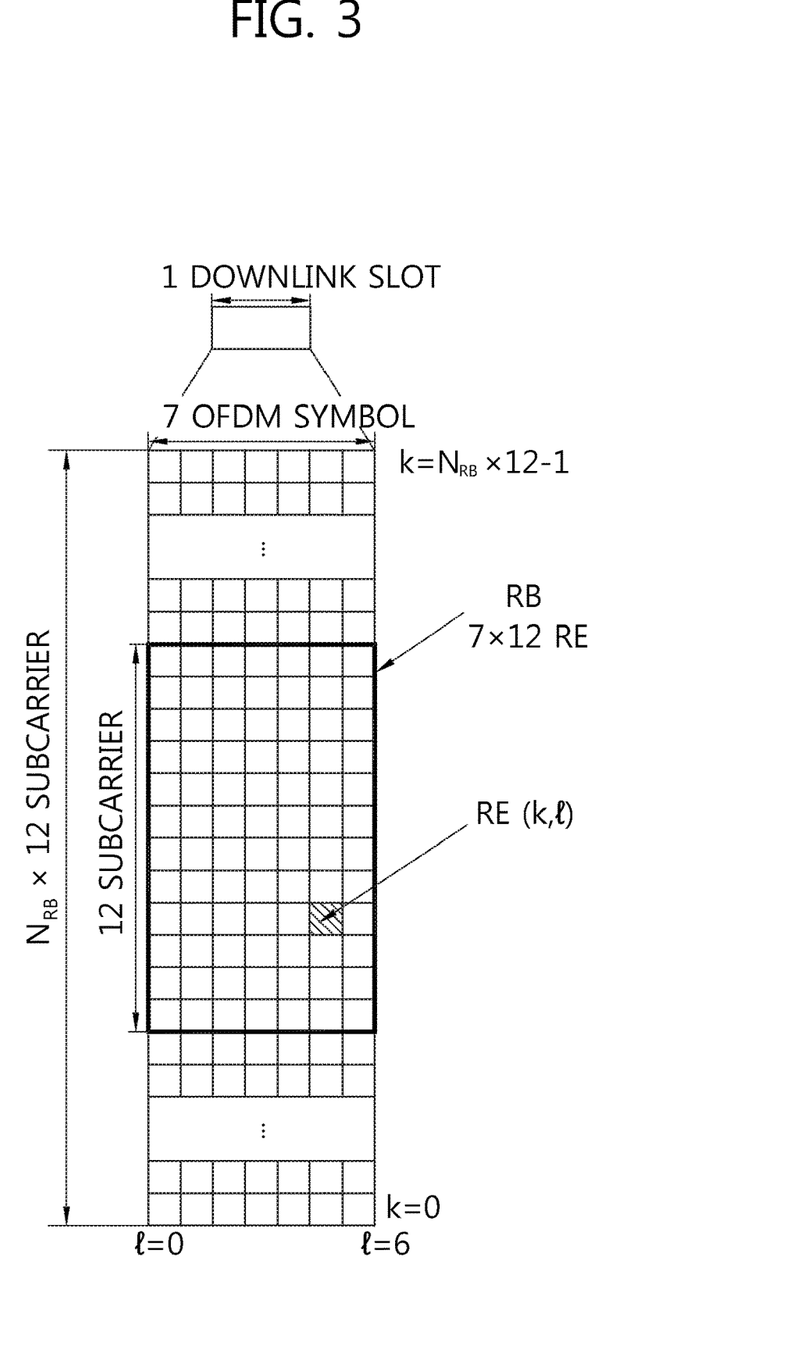
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
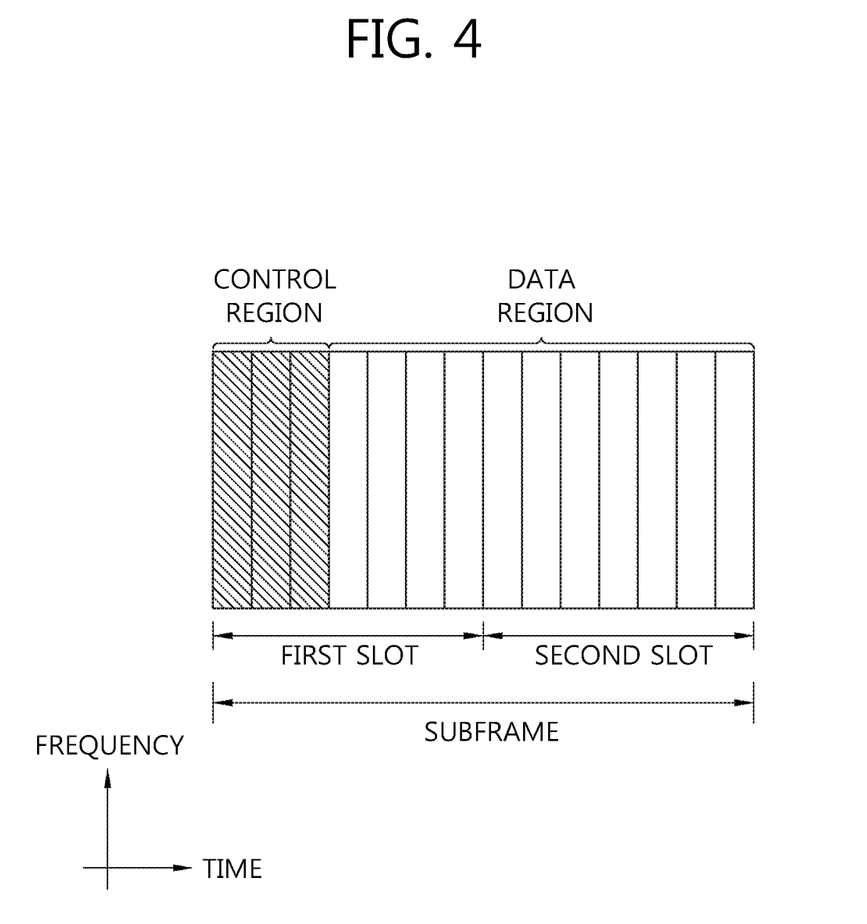
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

A physical multicast channel (PMCH) shall be processed and mapped to resource elements 3 with the following exceptions:

No transmit diversity scheme is specified.

Layer mapping and precoding shall be done assuming a single antenna port and the transmission shall use antenna port 4.

The PMCH can only be transmitted in the multicast broadcast single frequency network (MBSFN) region of an MBSFN subframe.

The PMCH shall use extended CP.

The PMCH is not mapped to resource elements used for transmission of MBSFN reference signals.

Figure 5:
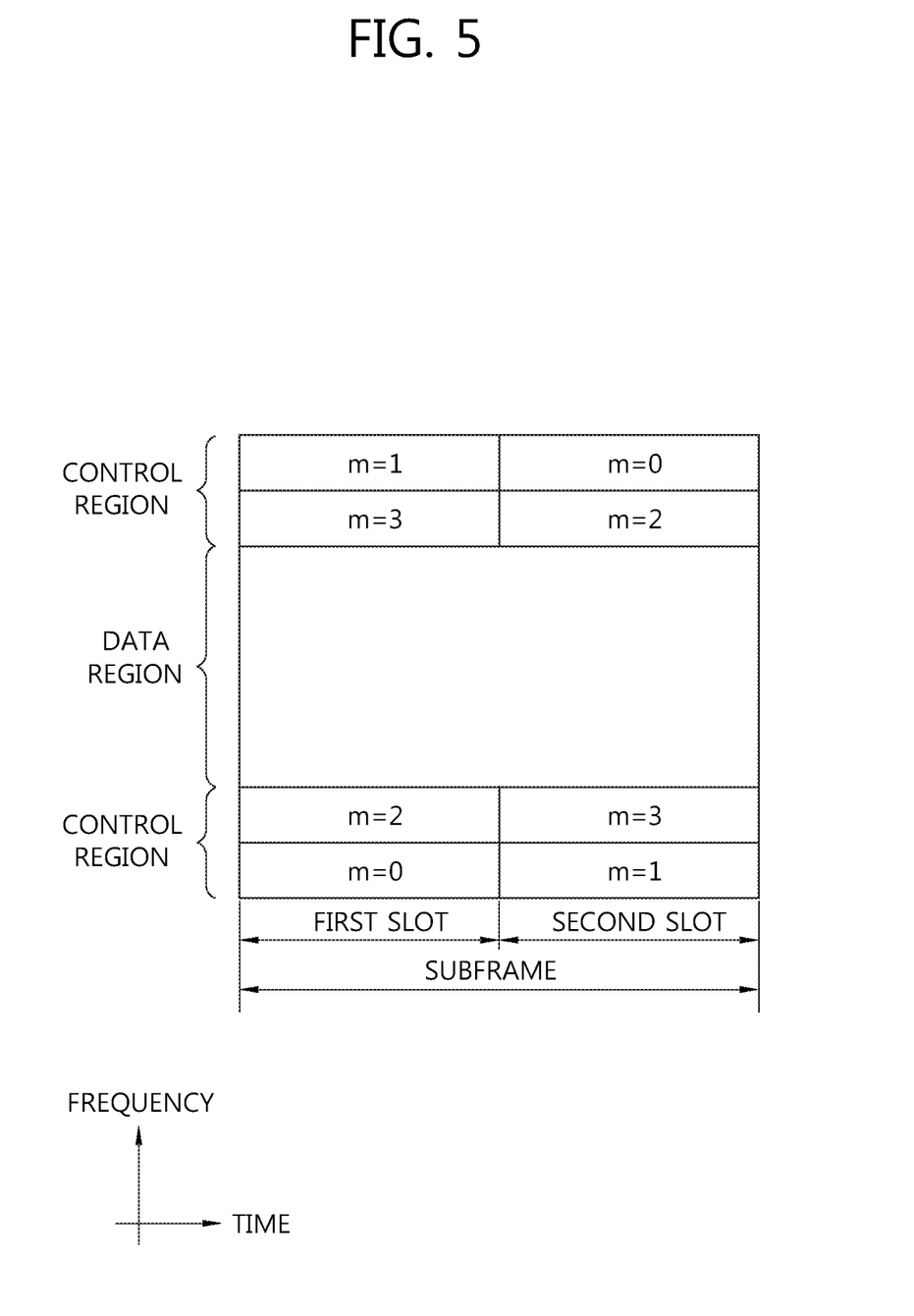
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Various kinds of DL reference signal (RS) are described. It may be referred to Section 6.10 of 3GPP TS 36.211 V11.5.0 (2013-12). Six types of DL reference signals are defined, which include cell-specific reference signal (CRS), MBSFN reference signal, UE-specific reference signal (i.e. demodulation reference signal (DM-RS)) associated with PDSCH, DM-RS associated with enhanced PDCCH (EPDCCH), positioning reference signal (PRS), and channel state information reference signal (CSI-RS). There is one RS transmitted per DL antenna port.

CRSs shall be transmitted in all DL subframes in a cell supporting PDSCH transmission. CRS are transmitted on one or several of antenna ports 0 to 3. MBSFN reference signal shall be transmitted in the MBSFN region of MBSFN subframes only when the PMCH is transmitted. MBSFN reference signals are transmitted on antenna port 4. MBSFN reference signals are defined for extended CP only. UE-specific reference signals associated with PDSCH are transmitted on antenna port(s) $p=5$, $p=7$, $p=8$ or $p=7, 8, \ldots, v+6$, where v is the number of layers used for transmission of the PDSCH, are present and are a valid reference for PDSCH demodulation only if the PDSCH transmission is associated with the corresponding antenna port, and are transmitted only on the physical resource blocks upon which the corresponding PDSCH is mapped. The DM-RS associated with EPDCCH is transmitted on the same antenna port p{107, 108, 109, 110} as the associated EPDCCH physical resource, is present and is a valid reference for EPDCCH demodulation only if the EPDCCH transmission is associated with the corresponding antenna port, and is transmitted only on the physical resource blocks upon which the corresponding EPDCCH is mapped.

PRSs shall only be transmitted in resource blocks in DL subframes configured for PRS transmission. If both normal and MBSFN subframes are configured as positioning subframes within a cell, the OFDM symbols in a MBSFN subframe configured for PRS transmission shall use the same CP as used for subframe #0. If only MBSFN subframes are configured as positioning subframes within a cell, the OFDM symbols configured for PRS in the MBSFN region of these subframes shall use extended CP length. In a subframe configured for PRS transmission, the starting positions of the OFDM symbols configured for PRS transmission shall be identical to those in a subframe in which all OFDM symbols have the same CP length as the OFDM symbols configured for PRS transmission.

CSI-RS is described. CSI-RSs are transmitted on one, two, four or eight antenna ports using $p=15$, $p=15, 16$, $p=15, \ldots 18$ and $p=15, \ldots 22$, respectively. CSI-RSs are defined for $\Delta f=15$ kHz only. In subframes configured for CSI-RS transmission, the CSI-RS sequence shall be mapped to complex-valued modulation symbols $a_{k,l(p)}$ used as reference symbols on antenna port p, according to Equation 1 described below.

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases} \quad <\text{Equation 1}>$$

$$l = l' + \begin{cases} l'' & \begin{array}{l}\text{CSI reference signal configurations}\\ \text{0-19, normal cyclic prefix}\end{array}\\ 2l'' & \begin{array}{l}\text{CSI reference signal configurations}\\ \text{20-31, normal cyclic prefix}\end{array}\\ l'' & \begin{array}{l}\text{CSI reference signal configurations}\\ \text{0-27, extended cyclic prefix}\end{array}\end{cases}$$

$$w_{l''} = \begin{cases} 1 & p \in \{15, 17, 19, 21\}\\ (-1)^{l''} & p \in \{16, 18, 20, 22\}\end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 1, $N_{RB}^{DL}$ is DL bandwidth configuration, expressed in multiples of resource block size in the frequency domain. $N_{RB}^{max,DL}$ is largest DL bandwidth configuration, expressed in multiples of resource block size in the frequency domain. The quantity (k', l') and the necessary conditions on $n_s$ are given by Table 1 and Table 2 described below for normal and extended CP, respectively. Table 1 shows mapping from CSI-RS configuration to (k', l') for normal CP. Table 2 shows mapping from CSI-RS configuration to (k', l') for extended CP.

TABLE 1

| | | The number of the CSI-RSs configured | | | | | |
|---|---|---|---|---|---|---|---|
| | | 1 or 2 | | 4 | | 8 | |
| | CSI-RS configuration index | (k', l') | $n_s$ mod 2 | (k', l') | $n_s$ mod 2 | (k', l') | $n_s$ mod 2 |
| TDD and FDD frame | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| TDD frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | | The number of the CSI-RSs configured | | | | | |
|---|---|---|---|---|---|---|---|
| | | 1 or 2 | | 4 | | 8 | |
| | CSI-RS configuration index | (k', l') | $n_s$ mod 2 | (k', l') | $n_s$ mod 2 | (k', l') | $n_s$ mod 2 |
| TDD and FDD frame | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| TDD frame | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Multiple CSI-RS configurations can be used in a given cell. A UE can be configured with multiple sets of CSI reference signals, up to three configurations for which the UE shall assume non-zero transmission power for the CSI-RS, and zero or more configurations for which the UE shall assume zero transmission power. The CSI-RS configurations for which the UE shall assume non-zero transmission power are provided by higher layers.

The CSI-RS configurations for which the UE shall assume zero transmission power in a subframe are given by a bitmap. For each bit set to one in the 16-bit bitmap, the UE shall assume zero transmission power for the resource elements corresponding to the four CSI-RS column in Table 1 and Table 2 described above for normal and extended CP, respectively, except for resource elements that overlap with those for which the UE shall assume non-zero transmission power CSI-RS as configured by higher layers. The most significant bit (MSB) corresponds to the lowest CSI-RS configuration index and subsequent bits in the bitmap correspond to configurations with indices in increasing order.

For a serving cell and UE configured in transmission mode (TM) 1-9, the UE can be configured with one zero-power (ZP) CSI-RS resource configuration. For a serving cell and UE configured in transmission mode 10, the UE can be configured with one or more ZP CSI-RS resource configuration(s). The following parameters are configured via higher layer signaling for each ZP CSI-RS resource configuration:

ZP CSI-RS Configuration list (16-bit bitmap ZeroPowerCSI-RS)

ZP CSI-RS subframe configuration $I_{CSI-RS}$.

The UE should not expect the configuration of ZP CSI-RS and PMCH in the same subframe of a serving cell. For frame structure type 1, the UE is not expected to receive the 16-bit bitmap ZeroPowerCSI-RS with any one of the 6 least significant bit (LSB) bits set to 1 for the normal CP case, or with any one of the 8 LSB bits set to 1 for the extended CP case. For frame structure type 2 and 4 CRS ports, the UE is not expected to receive the 16-bit bitmap ZeroPowerCSI-RS with any one of the 6 LSB bits set to 1 for the normal CP case, or with any one of the 8 LSB bits set to 1 for the extended CP case.

Further, for a serving cell and UE configured in TM 10, the UE can be configured with one or more CSI interference measurement (IM) resource configuration(s). The following parameters are configured via higher layer signaling for each CSI-IM resource configuration:

ZP CSI-RS configuration (Table 1 and Table 2 described above)

ZP CSI-RS subframe configuration $I_{CSI-RS}$.

A UE is not expected to receive CSI-IM resource configuration(s) that are not all completely overlapping with one ZP CSI-RS resource configuration which can be configured for the UE. A UE is not expected to receive a CSI-IM resource configuration that is not completely overlapping with one of the ZP CSI-RS resource configurations. A UE should not expect the configuration of CSI-IM resource and PMCH in the same subframe of a serving cell.

CSI-RSs can only occur in DL slots where ($n_s$ mod 2) fulfils the condition in Table 1 and Table 2 described above for normal and extended CP, respectively, and where the subframe number fulfils the conditions regarding CSI-RS subframe configuration. The subframe configuration period $T_{CSI-RS}$ and the subframe offset $\Delta_{CSI-RS}$ for the occurrence of CSI-RSs are listed in Table 3.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

In Table 3, the parameter $I_{CSI-RS}$ can be configured separately for CSI-RSs for which the UE shall assume non-zero and zero transmission power. Subframes containing CSI-RSs shall satisfy Equation 2.

$$(10 n_f + \lfloor n_s/2 \rfloor - \Delta_{CSI-RS}) \bmod T_{CSI-RS} = 0 \qquad \text{<Equation 2>}$$

The UE shall assume that CSI-RSs are not transmitted in the special subframe(s) in case of frame structure type 2, in subframes where transmission of a CSI-RS would collide with SystemInformationBlockType1 messages, in the primary cell (PCell) in subframes configured for transmission of paging messages in the PCell for any UE with the cell-specific paging configuration. The UE shall assume that none of the CSI-RSs corresponding to a CSI-RS configuration are transmitted in subframes where transmission of any of those CSI-RSs would collide with transmission of synchronization signals or physical broadcast channel (PBCH). Resource elements (k, l) used for transmission of CSI-RSs on any of the antenna ports in the set S, where S={15}, S={15, 16}, S={17, 17}, S={19, 20} or S={21, 22} shall not be used for transmission of PDSCH on any antenna port in the same slot.

Figure 6:
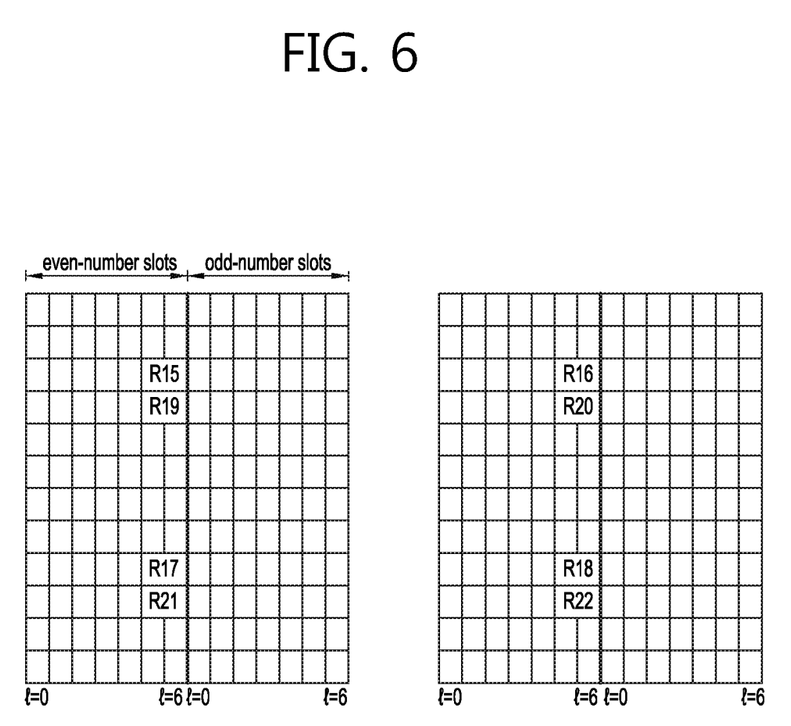
FIG. 6 shows mapping for CSI-RS configuration 0.

FIG. 6 shows mapping for CSI-RS configuration 0. Referring to FIG. 6, the CSI-RS sequence for antenna port 15 and antenna port 16 are allocated to the same resource elements corresponding to (2,5) and (2,6), by using an orthogonal cover code (OCC) with length of 2. The CSI-RS sequence for antenna port 17 and antenna port 18 are allocated to the same resource elements corresponding to (8,5) and (8,6), by using an OCC with length of 2. The CSI-RS sequence for antenna port 19 and antenna port 20 are allocated to the same resource elements corresponding to (3,5) and (3,6), by using an OCC with length of 2. The CSI-RS sequence for antenna port 21 and antenna port 22 are allocated to the same resource elements corresponding to (9,5) and (9,6), by using an OCC with length of 2.

In a dense small cell scenario, it is likely that a UE is connected with an overlaid macro and small cell for data offloading. In such a case, it is desirable for a UE to discover many cells within a communication range, and then, the overlaid macro layer may select the best cell considering loading information as well as other information. In other words, the best cell for data offloading may not be the best cell based on reference signal received power (RSRP)/reference signal received quality (RSRQ). Rather, a cell with low loading or many users may be desirable from overall cell management perspective. Thus, an advanced discovery procedure to allow detecting more cells than conventional mechanism may be considered.

Accordingly, in 3GPP LTE, a discovery signal (or, discovery reference signal (DRS)) has been newly introduced for one aspect of small cell enhancements. Hereinafter, discovery signal and DRS may be used interchangeably. A small call in off state may transmit the discovery signal for the UE to discovery the small cell. In order for the UE to receive immediately data packet which is to be transmitted when the small cell transits to on state, the small cell may carry information, which is necessary for procedures which should have been performed before the small transits to on state, in the discovery signal.

In terms of desired characteristics of advanced discovery signal, at least one of the followings may be considered.

(1) Detect more cells than legacy primary synchronization signal (PSS)/secondary synchronization signal (SSS)/CRS based cell detection (2) Detect cells in a short time, such as in a subframe (3) Perform measurement in a short time, such as in a subframe (4) Support necessary measurement for fast time scale on/off operation According to an embodiment of the present invention, a few candidates may be considered for advanced discovery algorithm as follows.

(1) PSS/(SSS)+CRS
(2) PSS/(SSS)+CSI-RS
(3) PSS/(SSS)+PRS
(4) PSS+SSS+CRS+(CSI-RS)

(5) Combination of one or more options of (1)-(3) described above (6) PSS+SSS+CRS+(CSI-RS): In this case, a UE may assume that CSI-RS is present only if configured with CSI-RS configuration such as scrambling identifier (ID), the resource configurations for CSI-RS, etc. In other words, a UE may perform transmission point (TP) identification only if network assistance related to CSI-RS is configured or the explicitly configured with the presence of CSI-RS resource.

It is expected that discovery signal should be used for coarse time/frequency tracking, measurement and quasi-collocation (QCL) (if necessary). Considering some of objectives, the design of discovery signal should meet the following requirements.

(1) Discovery signal should support coarse time synchronization with assumption of very high initial timing error (such as +−2.5 ms)

(2) Discovery signal should support coarse frequency synchronization with assumption of very high initial frequency error (such as 20 KHz)

(3) Discovery signal should support the detectability of at least three cells (or transmission points)

(4) Discovery signal should support sufficient accuracy of measurement

To support (1) and/or (2), it may be assumed that PSS and/or SSS is transmitted.

In terms of designing discovery signals, the following questions should be answered.

(1) In the same frequency, can cells transmitting advanced discovery signal and cells not transmitting advanced discovery signals coexist or not (2) If a cell transmits advanced discovery signals, will it transmit discovery signals in off-state as well as in on-state?

(3) From a UE measurement reporting perspective, does a UE report both measurement reports based on legacy and advanced discovery signals if available or report only one? When it reports only one, what is the criteria to select one report?

(4) Whether a UE can perform measurement based on advanced discovery signal even in discontinuous reception (DRX) mode: If this is supported, it may be required that a UE shall wake-up even in DRX cycle (not in OnDuration) to perform the measurement following DRS transmission timing/configuration. For example, if DRS is transmitted in every 160 ms, a UE shall wake up every 160 ms to perform the measurement.

(5) How does multiplexing between discovery signals from different cells will be performed? (Via time division multiplexing (TDM)/frequency division multiplexing (FDM)/code division multiplexing (CDM))

(6) Is there any active data transmission in subframe where discovery signal is transmitted? Without active data transmission, how to measure received signal strength indicator (RSSI)?

(7) Is there any necessity to increase the number of cell IDs from 504?

(8) What if system frame number (SFN) is not aligned among cells transmitting discovery signals together for efficient UE performance?

(9) What if CP length is not aligned among cells transmitting discovery signals together for efficient UE performance?

(10) What if discovery signal has been scheduled in MBSFN subframe?

(11) Are discovery signal transmission period and resource configuration should be configurable?

(12) How to transmit discovery signal in TDD?

ZP CSI-RS configurations for data rate matching according to an embodiment of the present invention is described. In essence, ZP-CSI-RS configurations configured to allow muting between CSI-RS for DRS (hereinafter, DRS-CSI-RS) transmissions among cells may not impact on UE behavior in terms of CSI feedback and others. Only it may be used for data rate matching for PDSCH and EPDCCH. Additional ZP-CSI-RS configuration for data rate matching for DRS may be configured only if DRS-CSI-RS based measurement is configured to a UE. When a UE is configured with transmission mode (TM) 10, the UE may apply data rate matching based on additional ZP-CSI-RS configurations for DRS (if configured), and then apply data rate matching based on PDSCH rate matching and quasi-colocation indicator (PQI) entry. For DCI 1A format, the UE may apply data rate matching for ZP-CSI-RS configurations for DRS muting (hereinafter, DRS ZP-CSI-RS configurations), and then, may apply the lowest indexed ZP CSI-RS resource among non DRS ZP-CSI-RS configurations.

More specifically, for ZP-CSI-RS configuration for data rate matching on DRS (For DRS ZP-CSI-RS), for frame structure type 1, the UE is not expected to receive the 16-bit bitmap ZeroPowerCSI-RS with any one of the 6 LSB bits set to 1 for the normal CP case, or with any one of the 8 LSB bits set to 1 for the extended CP case. For frame structure type 2, no restriction applies. The UE is expected to receive the 16-bit bitmap ZeroPowerCSI-RS with any one of the 16 LSB bits set to 1 for the normal CP case, or with any one of the 14 LSB bits set to 1 for the extended CP case. This may be applied only for DRS. Since only single antenna port 15 is used for DRS-CSI-RS, regardless of actual CRS ports, DRS-CSI-RS may be configured in those OFDM symbols where CRS with 4 CRS ports is present. Alternatively, this may be applied even for DRS-CSI-RS such that ZP-CSI-RS configuration may not indicate configuration 20-25 in case any of cell transmitting DRS-CSI-RS has 4 CRS ports.

Relationship between PRS and DRS according to an embodiment of the present invention is described. When a UE is configured with PRS, a UE may assume one of the followings.

(1) PRS may not be configured in the same subframe where DRS is configured. That is, the UE may not be expected to receive both PRS and DRS in the same subframe. More specifically, PRS may not be configured in the same subframe where DRS-CSI-RS is configured. If configured, the UE may ignore PRS or put higher priority on PRS. Or, it may be up to UE implementation which one to read.

(2) The UE may put a higher priority on PRS, and assume that DRS-CSI-RS colliding with PRS is not transmitted in the same subframe or DRS-CSI-RS configuration colliding with PRS is not configured. In other words, if DRS-CSI-RS from a cell collides with any PRS from a cell in the same subframe, it does not share the same resource. If it collides in terms of the resource, the UE may put higher priority on PRS or it may be up to UE implementation which one to read. In other words, a UE may not read DRS-CSI-RS configurations (or identify TP configured with that RE configuration) which collide with PRS in the same subframe (i.e., same resource and same subframe) in any PRB.

(3) When a UE is configured with PRS, a UE may assume that CSI-RS configurations colliding with PRS are not valid. If any CSI-RS configuration is configured, a UE may not identify TP for those configurations.

(4) A UE may assume that PRS is not configured when DRS measurement timing configuration (DMTC) is configured in a frequency. In other words, a UE may not be configured with both PRS and DRS based measurement in the same frequency. More specifically, a UE may assume that PRS is not configured when CSI-RS based DRS based measurement is configured. Or, it may assume that CSI-RS based DRS measurement is not configured if PRS is configured in that frequency. This implies that CRS-based DRS measurement and PRS-based measurement may be configured together in a frequency. Or, even though a UE is configured with both measurements, the reporting may not be triggered for CSI-RS such that a UE does not have to perform CSI-RS based measurements.

For determining CP length of a subframe in which CSI-RS is transmitted, the UE may follow subframe which contains SSS. Or, the UE may simply determine CP length of a subframe in which DRS is transmitted based on CP length used for the first subframe of a DRS occasion. The CP length detected by PSS/SSS may be assumed for CSI-RS and CRS transmission.

If CSI-RS is transmitted in a MBSFN subframe which is configured for MBSFN subframes and configured for PRS transmission where PRS occasion is configured for MBSFN subframes only and the CP used in subframe #0 is normal CP, a UE may not expect to receive CSI-RS in that subframe. If normal CP is used for CSI-RS transmission for DRS, if this occurs, a UE may assume that CSI-RS as DRS may not be transmitted in that subframe.

If a UE skips measurement due to the collision between CSI-RS and PMCH or CSI-RS and PRS for a cell/TP, not to jeopardize layer 1 or 3 filtering, a UE may transmit the same results used in previous reports. Some changes in filtering may be also considered. Further details may be left up to UE implementation.

If inter-frequency measurement for both PRS and DRS is configured, a UE may assume that the same CP is used in PSS/SSS for a cell in that frequency regardless of configuration of PRS. Or, a UE may be configured by higher layer which CP is used for PRS in a given frequency. If different CP is used between PRS and CSI-RS as DRS (detected by PSS/SSS), a UE may assume that PRS and CSI-RS are not be configured in the same subframe or a UE may not read/measure based on CSI-RS in the colliding subframe. In other case, it may be left to UE implementation.

Figure 7:
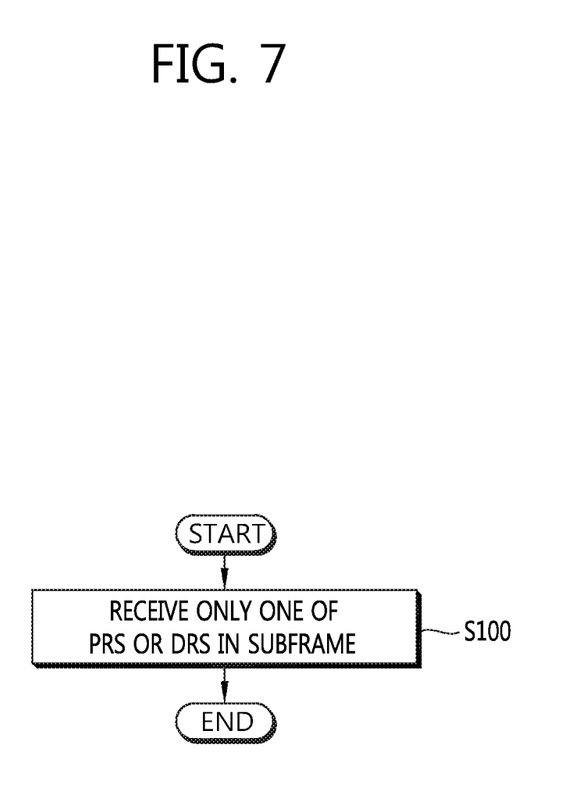
FIG. 7 shows an example of a method for receiving a reference signal according to an embodiment of the present invention.

FIG. 7 shows an example of a method for receiving a reference signal according to an embodiment of the present invention. In step S100, the UE receive only one of a PRS or a DRS in a subframe from a network. A CSI-RS may be used for the DRS. The PRS may not be configured in the subframe by the network, and the DRS may be configured in the subframe by the network. Alternatively, the PRS, configured by the network, may be ignored by the UE. Alternatively, the PRS, configured by the network, may have a higher priority than the DRS.

Relationship between PMCH and DRS according to an embodiment of the present invention is described. When DRS-CSI-RS is configured in a subframe, a UE may assume one of the followings.

(1) The subframe where CSI-RS is configured may be assumed as a normal subframe.

Particularly, in TDD, it is assumed as normal subframe, not MBSFN subframe.

(2) The subframe may be considered as MBSFN subframe in terms of CRS transmission unless other information is given.

A UE may assume that PMCH is not transmitted during DRS occasion. In other words, for the subframes configured for DRS based measurements, the UE may not be expected to receive PMCH. Alternatively, a UE may not be expected configuration of DRS-CSI-RS and PMCH in the same subframe from any cell. Even if configured, a UE may not be expected to receive DRS-CSI-RS in that subframe colliding with PMCH. For ZP CSI-RS, the same principle may be applied. For ZP-CSI-RS configurations for data rate matching, PMCH and ZP-CSI-RS may not collide in the same subframe. Thus, in general, if CSI-RS is configured for DRS, a UE may not be expected configuration of DRS-CSI-RS or DRS-occasion and PMCH in the same subframe (or PMCH not in DRS occasion from any cell).

Alternatively, a UE may assume that PMCH and DRS may not configured in the same frequency. In other words, a UE may not be configured with both PMCH and DRS.

CSI PDSCH assumption according to an embodiment of the present invention is described. In the CSI reference resource, the UE shall assume the following for the purpose of deriving the CQI index, and if also configured, PMI and RI:

The first 3 OFDM symbols are occupied by control signaling

No resource elements used by PSS/SSS or PBCH or EPDCCH or DRS-CSI-RS (Even though a UE is configured with ZP-CSI-RS in a valid DL subframe, it may not assume RE is used by DRS-CSI-RS transmission.)

CP length of the non-MBSFN subframes

Redundancy version (RV) 0

For TM 9 CSI reporting, CRS REs are as in non-MBSFN subframes. If the UE is configured for PMI/RI reporting, the UE-specific RS overhead is consistent with the most recent reported rank if more than one CSI-RS port is configured, and is consistent with rank 1 transmission if only one CSI-RS port is configured. PDSCH signals on antenna ports $\{7, \ldots 6+v\}$ for v layers would result in signals equivalent to corresponding symbols transmitted on antenna ports $\{15, \ldots 14+P\}$, $P\{1, 2, 4, 8\}$ is the number of CSI-RS ports configured.

For TM 10 CSI reporting, if a CSI process is configured without PMI/RI reporting, if the number of antenna ports of the associated CSI-RS resource is one, a PDSCH transmission is on single-antenna port, port 7. The channel on antenna port $\{7\}$ is inferred from the channel on antenna port $\{15\}$ of the associated CSI-RS resource. CRS REs are as in non-MBSFN subframes. The CRS overhead is assumed to be the same as the CRS overhead corresponding to the number of CRS antenna ports of the serving cell. The UE-specific RS overhead is 12 REs per PRB pair.

Otherwise, if the number of antenna ports of the associated CSI-RS resource is 2, the PDSCH transmission scheme assumes the transmit diversity scheme on antenna ports $\{0, 1\}$ except that the channels on antenna ports $\{0, 1\}$ are inferred from the channels on antenna port $\{15, 16\}$ of the associated CSI resource respectively. If the number of antenna ports of the associated CSI-RS resource is 4, the PDSCH transmission scheme assumes the transmit diversity scheme on antenna ports $\{0, 1, 2, 3\}$ except that the channels on antenna ports $\{0, 1, 2, 3\}$ are inferred from the channels on antenna ports $\{15, 16, 17, 18\}$ of the associated CSI-RS resource respectively. The UE is not expected to be configured with more than 4 antenna ports for the CSI-RS resource associated with the CSI process configured without PMI/RI reporting. The overhead of CRS REs is assuming the same number of antenna ports as that of the associated CSI-RS resource. UE-specific RS overhead is zero.

For TM 10 CSI reporting, if a CSI process is configured with PMI/RI reporting, CRS REs are as in non-MBSFN subframes. The CRS overhead is assumed to be the same as the CRS overhead corresponding to the number of CRS antenna ports of the serving cell. The UE-specific RS overhead is consistent with the most recent reported rank for the CSI process if more than one CSI-RS port is configured, and is consistent with rank 1 transmission if only one CSI-RS port is configured. PDSCH signals on antenna ports {7, . . . 6+v} for v layers would result in signals equivalent to corresponding symbols transmitted on antenna ports {15, . . . 14+P}, P{1, 2, 4, 8} is the number of antenna ports of the associated CSI-RS resource.

Assume no REs allocated for CSI-RS and ZP CSI-RS

Assume no REs allocated for DRS ZP CSI-RS (if not specified before as excluding DRS)

Assume no REs allocated for PRS

The PDSCH transmission scheme depending on the transmission mode currently configured for the UE (which may be the default mode).

UE assumption of interference measurement resource (IMR) according to an embodiment of the present invention is described. A UE may not be expected to receive CSI-IM resource configuration(s) that are not all completely overlapping with one ZP CSI-RS resource configuration which can be configured for the UE at least enhanced interference management with traffic adaptation (eIMTA) is not configured. Further, a UE may not be expected to receive a CSI-IM resource configuration that is not completely overlapping with one of the ZP CSI-RS resource configurations among any ZP CSI-RS configurations, or among ZP CSI-RS configurations not used for data rate matching for DRS (excluding up to five ZP CSI-RS configurations used for data rate matching for DRS-CSI-RS muting). In other words, ZP CSI-RS configurations for data rate matching on DRS-CSI-RS may not be used for IMR configuration.

Figure 8:
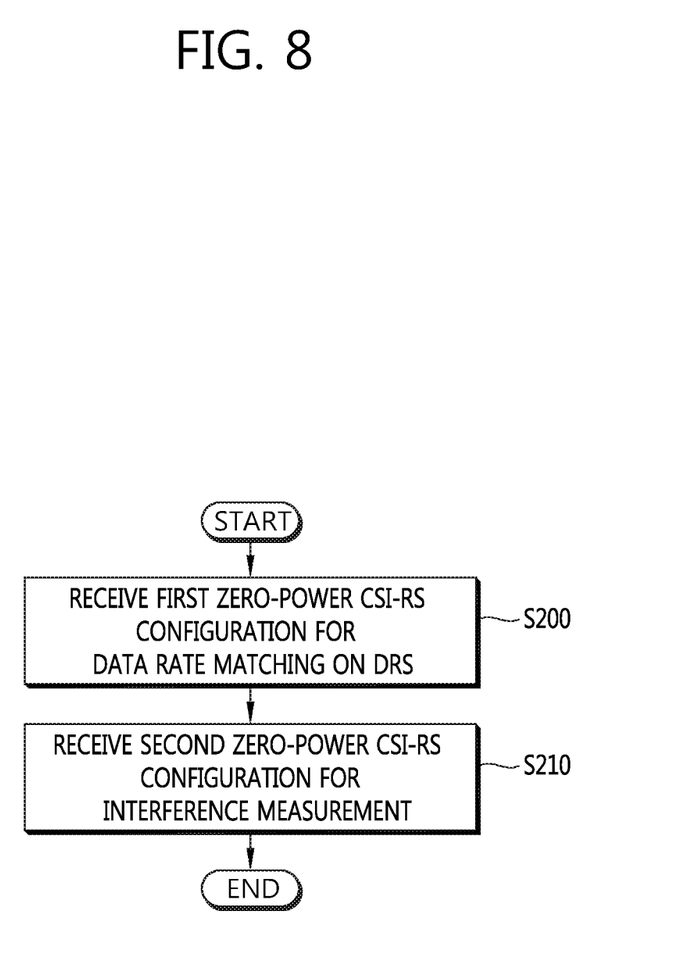
FIG. 8 shows an example of a method for receiving a zero-power CSI-RS configuration according to an embodiment of the present invention.

FIG. 8 shows an example of a method for receiving a zero-power CSI-RS configuration according to an embodiment of the present invention. In step S200, the UE receives at least one first zero-power CSI-RS configuration for data rate matching on a DRS from a network. In step S210, the UE receives a second zero-power CSI-RS configuration for interference measurement from the network. The at least one first zero-power CSI-RS configuration is not used for the second zero-power CSI-RS configuration. A CSI-RS may be used for the DRS. A maximum number of the at least one first zero-power CSI-RS configuration may be five. The second zero-power CSI-RS configuration may be completely overlapped with one of zero-power CSI-RS resource configurations not used for data rate matching for the DRS. The second zero-power CSI-RS configuration may be completely overlapped with one of zero-power CSI-RS resource configurations. The second zero-power CSI RS configuration may be configured for transmission mode 10. The second zero-power CSI RS configuration may be received via higher layer signaling.

DRS-CSI-RS and Feedback-CSI-RS according to an embodiment of the present invention is described. When DRS-CSI-RS and Feedback-CSI-RS collide in the same resource, CSI-RS energy per resource element (ERPE) and DRS-CSI-RS EPRE may be assumed to be equal in additional the same scrambling identity. In terms of quasi-collocation (QCL) relationship, a UE may assume that the same QCL relationship between DRS-CSI-RS and physical cell ID (or CRS scrambling ID) is used for feedback-CSI-RS with the same scrambling identify and collide in the same resource.

Figure 9:
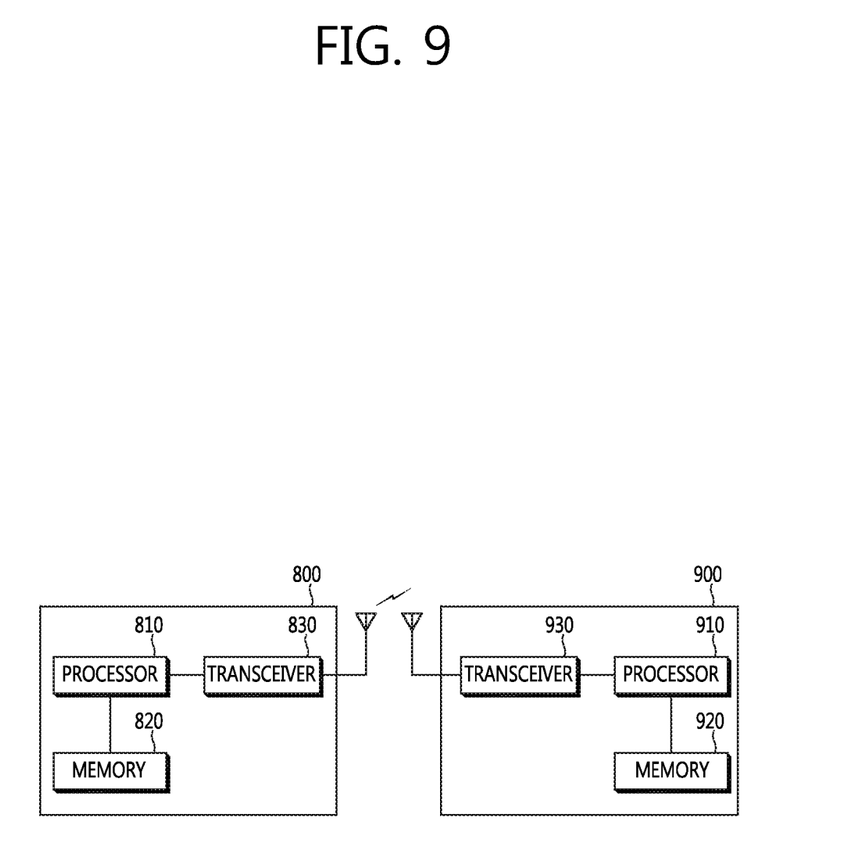
FIG. 9 shows a wireless communication system to implement an embodiment of the present invention.

FIG. 9 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for receiving, by a user equipment (UE), a zero-power channel state information reference signal (CSI-RS) configuration in a wireless communication system, the method comprising:

receiving at least one first zero-power CSI-RS configuration for data rate matching on a discovery reference signal (DRS) from a network; and receiving a second zero-power CSI-RS configuration for interference measurement from the network, wherein the at least one first zero-power CSI-RS configuration is not used for the second zero-power CSI-RS configurations wherein, for the at least one first zero-power CSI-RS configuration and for a frame structure type 1, the UE is not expected to receive a 16 bit bitmap zero-power CSI-RS with any one of 6 least significant bit (LSB) bits set to 1 for a normal cyclic prefix (CP), or with any one of 8 LSB bits set to 1 for an extended CP, and wherein, for the at least one first zero-power CSI-RS configuration and for a frame structure type 2, the UE is expected to receive a 16 bit bitmap zero-power CSI-RS with any one of 16 LSB bits set to 1 for the normal CP, or with any one of 14 LSB bits set to 1for the extended CP.

2. The method of claim 1, wherein a CSI-RS is used for the DRS.

3. The method of claim 1, wherein a maximum number of the at least one first zero-power CSI-RS configuration is five.

4. The method of claim 1, wherein the second zero-power CSI-RS configuration is completely overlapped with one of zero-power CSI-RS resource configurations not used for data rate matching for the DRS.

5. The method of claim 1, wherein the second zero-power CSI RS configuration is configured for transmission mode 10.

6. The method of claim 1, wherein the second zero-power CSI RS configuration is received via higher layer signaling.

\* \* \* \* \*